United States Patent
Bucks et al.

(10) Patent No.: US 6,922,022 B2
(45) Date of Patent: Jul. 26, 2005

(54) LED SWITCHING ARRANGEMENT FOR ENHANCING ELECTROMAGNETIC INTERFERENCE

(75) Inventors: Marcel Johannes Maria Bucks, Best (NL); Engbert Bernard Gerard Nijhof, Best (NL)

(73) Assignee: Lumileds Lighting U.S. LLC, San Jose, CA (US)

( * ) Notice: Subject to any disclaimer, the term of this patent is extended or adjusted under 35 U.S.C. 154(b) by 0 days.

(21) Appl. No.: 10/483,861

(22) PCT Filed: Jul. 18, 2002

(86) PCT No.: PCT/IB02/03110

§ 371 (c)(1),
(2), (4) Date: Jan. 14, 2004

(87) PCT Pub. No.: WO03/009653

PCT Pub. Date: Jan. 30, 2003

(65) Prior Publication Data

US 2004/0178749 A1 Sep. 16, 2004

(30) Foreign Application Priority Data

Jul. 19, 2001 (EP) .......................................... 01202769

(51) Int. Cl.$^7$ ........................... H05B 41/16; H02M 5/42
(52) U.S. Cl. ....................... 315/274; 315/276; 315/279; 363/89; 363/16
(58) Field of Search ................................. 315/274, 276, 315/279, 221, 257, 354, 209 R, 224; 363/89, 16, 40, 82, 80

(56) References Cited

U.S. PATENT DOCUMENTS 5,682,306 A * 10/1997 Jansen .......................... 363/89
6,088,242 A * 7/2000 Koegel et al. ............ 363/56.11

* cited by examiner

Primary Examiner—Tuyet Thi Vo
(74) Attorney, Agent, or Firm—Dicran Halajian

(57) ABSTRACT

The invention relates to a switching arrangement for operating at least one LED, which switching arrangement is provided with input terminals (1, 2) for connecting a supply source, —output terminals (3, 4) for connecting the LED to be operated, —a first series circuit (I) between one of the input terminals (1) and one of the output terminals (3), including at least a self-inductance (L), a capacitor (C) and a diode (D), —a second series circuit (II) between the input terminals, including at least the self-inductance (L) and a switching element (S) which is alternately switched to a conducting state and a non-conducting state at a high frequency, —a third series circuit (III) between the output terminals, including the diode and an inductive winding (SW). According to the invention, the inductive winding forms a first winding (SW1) of a transformer (T) which has a second winding (SW2) that forms part of the first series circuit and which also has a connection point with the first winding.

5 Claims, 4 Drawing Sheets

LED SWITCHING ARRANGEMENT FOR ENHANCING ELECTROMAGNETIC INTERFERENCE

FIELD OF THE INVENTION

The invention relates to a switching arrangement for operating a load, which switching arrangement is provided with input terminals for connecting a supply source, output terminals for connecting the load to be operated, a first series circuit between one of the input terminals and one of the output terminals, including at least a self-inductance, a capacitor and a diode, a second series circuit between the input terminals, including at least said self-inductance and a switching element which is alternately switched to a conducting state and a non-conducting state at a high frequency, and a third series circuit between the output terminals, including at least said diode and an inductive winding.

DESCRIPTION OF THE RELATED ART

A switching arrangement of the kind referred to in the introduction is known from U.S. Pat. No. 5,682,306. In the known switching arrangement, which is also known by the name of SEPIC (Single Ended Primary Inductance Converter), the self-inductance forms a first energy storage element, and there will be a voltage across the capacitor substantially of the magnitude of an input voltage applied to the input terminals. This type of converter appears to be suitable for operating an LED array comprising at least one LED as the load. LED arrays are very suitable for use as a light source, for example in a traffic lights installation, inter alia on account of their low energy consumption in comparison with incandescent lamps which are suitable for use in such traffic lights installations and on account of the fact that they have a much longer life than the incandescent lamps in question. In such an application, the switching arrangement and the LED array in question are generally supplied with power from a public mains as the power supply source.

One drawback of the known switching arrangement is the occurrence of a relatively high level of radio interference (EMI).

It is the object of the invention to provide a measure for reducing the EMI level.

SUMMARY OF THE INVENTION

In order to achieve that objective, a switching arrangement of the kind referred to in the introduction as the switching arrangement according to the invention is characterized in that the inductive winding forms a first winding of a transformer which has a second winding that forms part of the first series circuit and which also has a connection point with the first winding.

In this way it appears to be realized that a voltage change at a connection point between the first and the second series circuit caused by the periodic switching of the switching element to a non-conducting state is accompanied by a longer drift, which is highly conductive both to a significant reduction of EMI and to a shift to lower frequencies.

Preferably, the second winding is directly connected to one of the output terminals by means of a snubber circuit. This helps to achieve a further reduction of the generation of interference signals which, surprisingly, has a negligible effect on the power transfer of the inductive winding.

An advantageous effect is realized if the winding ratio n1:n2 between the first and the second winding is in accordance with the relation $1 \geq n1:n2 \leq 0.66$. The occurrence of inevitable leakage between the windings is compensated by selecting a value n1 which is smaller than n2.

In an advantageous embodiment of the switching arrangement according to the invention, the first and the second winding together form a secondary winding of the transformer, which is provided with a primary winding that forms part of both the first and the second series circuit. It has been found that this enables a significant further reduction of EMI to be achieved, because a high-frequency voltage signal across the self-inductance caused by the high-frequency switching of the switching element is effectively compensated in large measure via the voltage induced in the primary winding. An optimum result can be achieved if the arrangement is configured in accordance with the relation $$2\pi[(L1+Ls)C3]^{1/2} > \delta,$$

wherein:

L1 is the magnitude of the self-inductance in H,

Ls is the magnitude of the self-inductance of the secondary winding in H,

C3 is the capacitance of the capacitor in F, and $\delta$ is the fraction in s of each switching period of the switching element during which the switching element is switched in its non-conducting state.

A further advantage can be realized if a bypass capacitor is arranged between the input terminals, which capacitor functions as a bypass for the high-frequency ripple current signal generated by the primary transformer winding.

BRIEF DESCRIPTION OF THE DRAWINGS

The above and further aspects of the invention will be explained in more detail hereinafter with reference to a drawing of the switching arrangement according to the invention. In the drawing

DETAILED DESCRIPTION OF THE INVENTION

Figure 1:
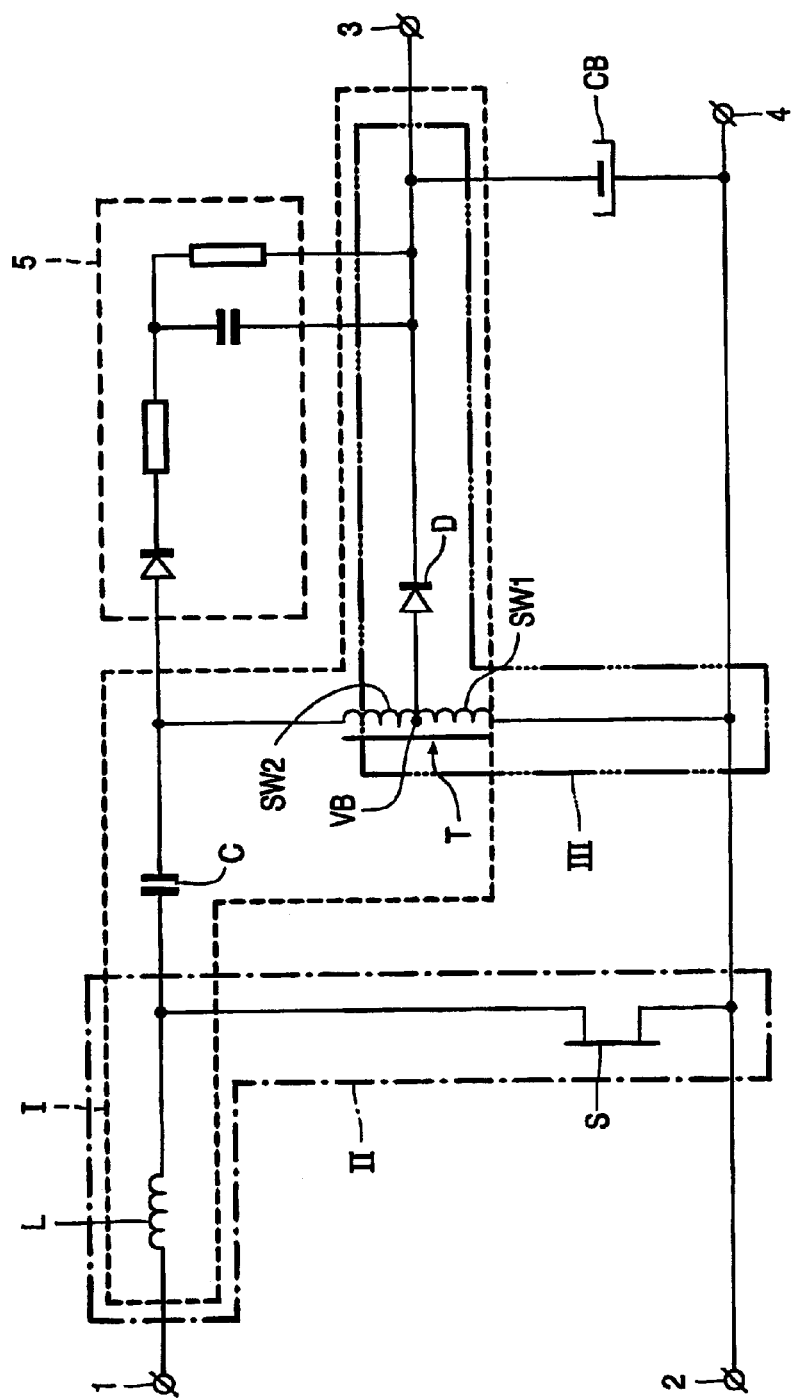
FIG. 1 shows a diagram of a switching arrangement according to the invention.

A switching arrangement according to the invention for operating at least one LED is shown in FIG. 1, which switching arrangement is provided with input terminals 1,2 for connecting a supply source, output terminals 3,4 for connecting the LED to be operated, a first series circuit 1 between one of the input terminals 1 and one of the output terminals 3, including at least a self-inductance L, a capacitor C and a diode D, a second series circuit II between the input terminals 1,2, including at least said self-inductance L and a switching element S which is alternately switched to a conducting state and a non-conducting state at a high frequency, a third series circuit III between the output terminals 3,4, including at least the diode D and an inductive winding.

Furthermore, a buffer capacitor CB is arranged between the output terminals 3,4.

The inductive winding forms a first winding SW1 of a transformer T which has a second winding SW2 that forms part of the first series circuit and which also has a connection point VB with the first winding. Preferably, the second winding SW2 is directly connected to one of the output terminals by means of a snubber circuit 5. This helps to achieve a further reduction of the generation of interference signals which, surprisingly, has a negligible effect on the power transfer of the inductive winding.

In an advantageous embodiment, a bypass capacitor BYC is arranged between the input terminals 1,2.

Figure 2:
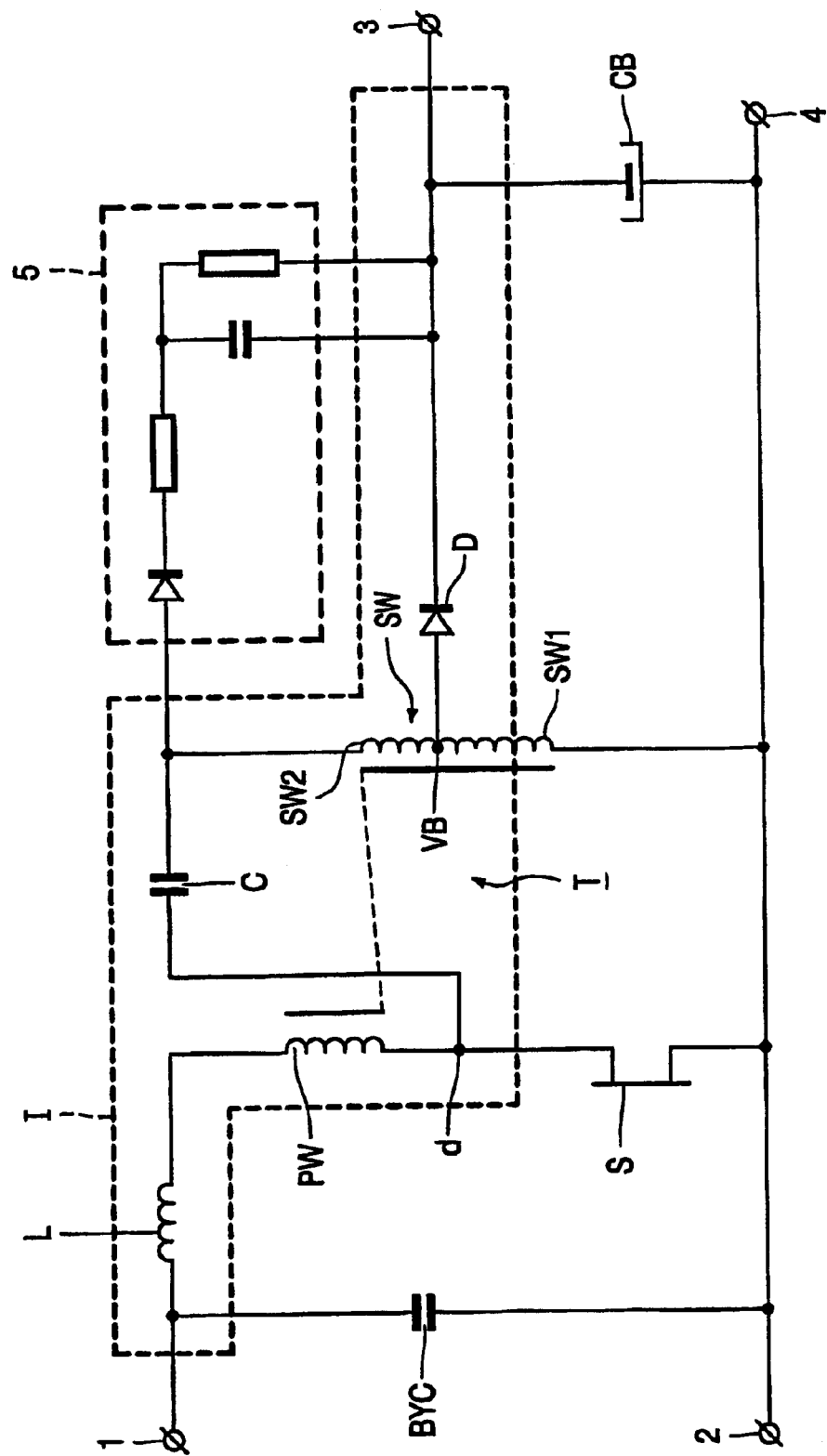
FIG. 2 shows a variant of the switching arrangement according to FIG. 1, FIGS. 3A,B show current and voltage diagrams of a switching arrangement according to the invention.

In a variant of the switching arrangement according to the invention which is shown in FIG. 2, the inductive winding forms a secondary winding SW of the transformer T which has a second winding PW that forms part both of the first and of the second series circuit. A connection point between the switching element S and the primary winding PW forms a drain d of the switching element.

A practical embodiment of a switching arrangement according to the invention as described in FIG. 1 is in particular suitable for being operated on a 230V, 50 Hz supply source. The switching arrangement is suitable for operating an LED array, for example forming part of a traffic lights installation. An array which is used in practice is of the type GR 090053224, made by Lumileds Lighting, which LED's emit green light. The circuit arrangement is capable of supplying the array with a controlled current of a magnitude ranging between 540 mA and 750 mA during operation, in dependence inter alia on the temperature of the array.

In the switching arrangement, the self-inductance has a value L1 of 3900 $\mu$H and the capacitor C has a capacitance C3 of 22 nF. The first and the second winding SW1, SW2 of the transformer T comprise 36 and 54 turns, respectively, and have a self-inductance of 85 $\mu$H and 455 $\mu$H, respectively. The buffer capacitor CB has a value of 330 $\mu$H. The switching element S is made up of a MOSFET type 2N60S5, made by Siemens. The value of the bypass capacitor BYC is 47 nF.

When a connected array as described above is being operated, the switching element is alternately switched to a conducting and a non-conducting state at a high frequency of approximately 60 kHz. The fraction $\delta$ of each switching period of the switching element during which the switching element is switched in a non-conducting state ranges between 13 $\mu$s and 16 $\mu$s.

A practical embodiment of a switching arrangement as shown in FIG. 2 is in particular suitable for being operated at a supply voltage of 110V, 60 Hz. The secondary winding SW of the transformer T has a self-inductance Ls of 120 $\mu$H. The winding ratio of the primary winding PW and the secondary winding SW is 1:1. The primary and the secondary winding comprise 62 and 56 turns, respectively. The first winding and the second winding of the secondary winding each have 28 turns and a self-inductance of 50 $\mu$H. The switching element S is made up of a MOSFET type IRF730, made by International Rectifier. The value of the bypass capacitor BYC is 100 nF. The values of the other components correspond to those of the embodiment as shown in FIG. 1.

Figure 3A:
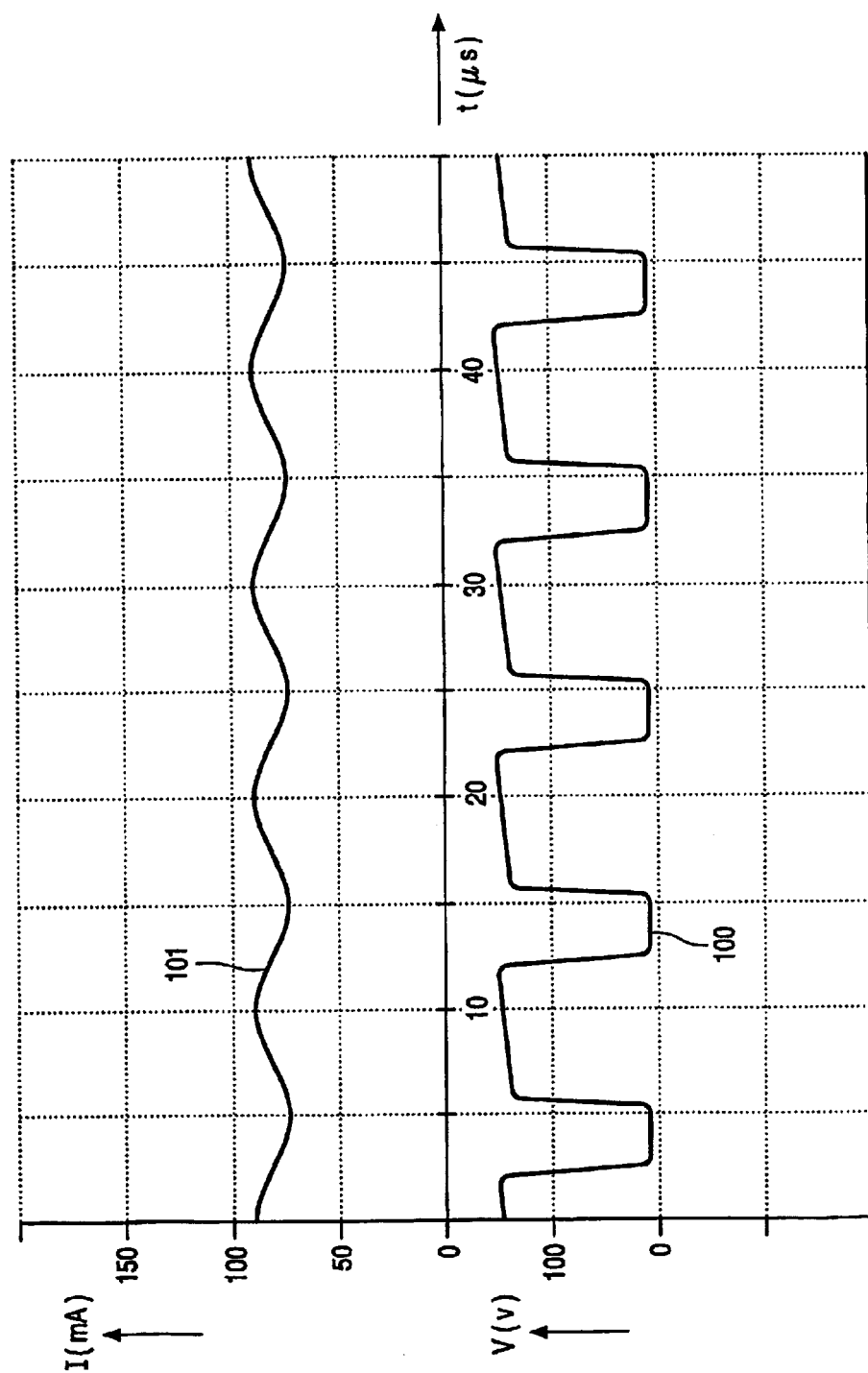
Figure 3B:
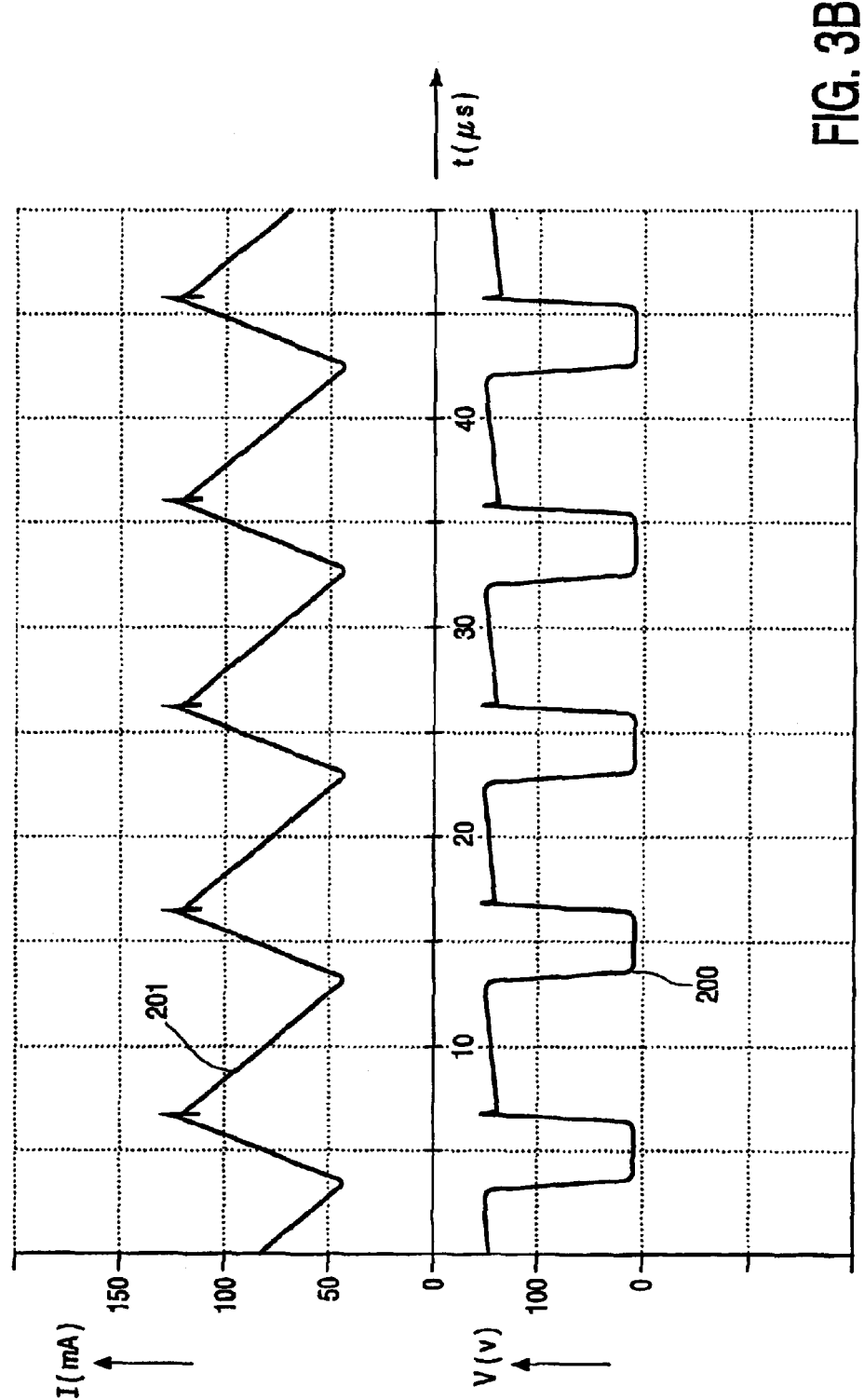

FIG. 3A shows, by way of illustration current and voltage curves of a practical embodiment of the switching arrangement of FIG. 2, and FIG. 3B shows, by way of comparison, corresponding curves of a switching arrangement as shown in FIG. 1. Both FIG. 3A and FIG. 3B show the drift in time of, respectively, the voltage (curve 100, 200) and the current (curve 101, 201) at the location of the drain d of the switching element S in the form of a MOSFET. In the Figures, the horizontal axis is the time axis. The current I and the voltage V are plotted on the vertical axis.

In the case of FIG. 3B, the switching arrangement as described in FIG. 1 is concerned. In the case of FIG. 3A, the switching arrangement as described in FIG. 2 is concerned. In both cases the switching arrangement is operated on a 120V dc supply voltage. A comparison between the two shows that the use of the primary winding PW leads to a significant reduction as regards the variation in the magnitude of the current. Furthermore it appears that periodic switching of the switching element to a non-conducting state results in a reduction of the high-frequency ripple on the current. Both phenomena are highly conducive to a further reduction of EMI.

What is claimed is:

1. A switching arrangement for driving at least one LED, which switching arrangement is provided with input terminals for connecting a supply source, output terminals for connecting the LED to be operated, a first series circuit between one of the input terminals and one of the output terminals, including at least a self-inductance, a capacitor and a diode, a second series circuit between the input terminals, including at least said self-inductance and a switching element which is alternately switched to a conducting state and a non-conducting state at a high frequency and, a third series circuit between the output terminals, including said diode and an inductive winding, characterized in that the inductive winding forms a first winding of a transformer which has a second winding that forms part of the first series circuit and which also has a connection point with the first winding.

2. The switching arrangement as claimed in claim 1, characterized in that the winding ratio n1:n2 between the first and the second winding is in accordance with the relation $1 \geq n1:n2 \leq .66$.

3. The switching arrangement as claimed in claim 1, characterized in that the arrangement is configured in accordance with the relation $$2\Pi[(L1+Ls)C3]^{1/2} > \delta,$$

wherein:

L1 is the magnitude of the self-inductance in H,

Ls is the magnitude of the self-inductance of the secondary winding in H,

C3 is the capacitance of the capacitor in F, and $\delta$ is the fraction in s of each switching period of the switching element during which the switching element is switched in its non-conducting state.

4. The switching arrangement as claimed in claim 1, characterized in that the inductive winding forms a secondary winding of the transformer which has a primary winding that forms part of both the first and the second series circuit.

5. The arrangement as claimed in claim 1, characterized in that a bypass capacitor is arranged between the input terminals.

* * * * *